United States Patent
Kaspar et al.

(10) Patent No.: US 11,961,115 B2
(45) Date of Patent: *Apr. 16, 2024

(54) MACHINE LEARNING WITH DATA SYNTHESIZATION

(71) Applicant: DOORDASH, INC., San Francisco, CA (US)

(72) Inventors: Robert Bryant Kaspar, Berkeley, CA (US); Alok Gupta, San Francisco, CA (US); Aman Dhesi, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,917

(22) Filed: May 18, 2023

(65) Prior Publication Data
US 2023/0289847 A1 Sep. 14, 2023

Related U.S. Application Data

(63) Continuation of application No. 17/197,511, filed on Mar. 10, 2021, now Pat. No. 11,682,036.

(51) Int. Cl.
*G06Q 30/0242* (2023.01)
*G06F 18/21* (2023.01)
(Continued)

(52) U.S. Cl.
CPC ..... *G06Q 30/0244* (2013.01); *G06F 18/2148* (2023.01); *G06F 18/217* (2023.01); *G06N 20/00* (2019.01)

(58) Field of Classification Search
CPC .. G06Q 30/0244; G06N 20/00; G06K 9/6257; G06K 9/626
See application file for complete search history.

(56) References Cited

U.S. PATENT DOCUMENTS 8,719,192 B2 * 5/2014 Ji .......................... G06N 20/00
706/12
9,183,562 B2 * 11/2015 Chittilappilly ......... G06Q 30/02
(Continued)

OTHER PUBLICATIONS

Crawford, Comparing Slopes of a regression line with a control sample, 2004, Cortex, pp. 533-548.*

*Primary Examiner* — Michael I Ezewoko
(74) *Attorney, Agent, or Firm* — MATTINGLY & MALUR, PC

(57) ABSTRACT

In some examples, a computing device may receive data from a plurality of groups of data sources. The computing device may access a plurality of data synthetization machine learning models configured for generating synthetic data. Respective ones of the data synthetization machine learning models may correspond to respective ones of the groups of data sources. The computing device generates first synthetic data by inputting, to a first data synthetization machine learning model, first data received from a first data source group, and generates second synthetic data by inputting, to a second data synthetization machine learning model, second data received from a second data source group. The computing device determines an allocation of resources based at least in part on comparing the first data and the first synthetic data with the second data and the second synthetic data.

17 Claims, 7 Drawing Sheets

(51) Int. Cl.
*G06F 18/214* (2023.01)
*G06N 20/00* (2019.01)

(56) References Cited

U.S. PATENT DOCUMENTS

| | | | | |
|---|---|---|---|---|
| 9,858,526 | B2* | 1/2018 | McCann | G06N 5/02 |
| 10,423,890 | B1* | 9/2019 | Fogarty | G06N 5/047 |
| 10,438,235 | B2* | 10/2019 | Tulloch | G06Q 50/01 |
| 10,586,614 | B1* | 3/2020 | Cai | G06N 20/20 |
| 10,706,454 | B2* | 7/2020 | Li | G06Q 30/0631 |
| 11,109,083 | B2* | 8/2021 | Saini | H04N 21/23614 |
| 11,288,709 | B2* | 3/2022 | Yan | G06Q 30/0275 |
| 11,430,002 | B2* | 8/2022 | Swamy | G06Q 40/06 |
| 11,775,813 | B2* | 10/2023 | Kumbi | G06Q 30/0202 |
| | | | | 706/21 |
| 2014/0250044 | A1* | 9/2014 | McCann | G06N 5/02 |
| | | | | 706/47 |
| 2017/0091813 | A1* | 3/2017 | Wong | G06Q 30/0254 |
| 2018/0365718 | A1* | 12/2018 | Sprecher | G06Q 30/0202 |
| 2019/0138912 | A1* | 5/2019 | Modarresi | G06N 5/01 |
| 2019/0303980 | A1* | 10/2019 | Yan | G06Q 30/0275 |
| 2019/0303995 | A1* | 10/2019 | Li | G06Q 30/0633 |
| 2020/0027157 | A1* | 1/2020 | Xu | G06N 7/01 |
| 2020/0245009 | A1* | 7/2020 | Saini | H04N 21/23614 |
| 2020/0294083 | A1* | 9/2020 | Del Hagen | G06F 9/547 |
| 2020/0356927 | A1* | 11/2020 | Abelenda | G06Q 10/06311 |
| 2022/0108334 | A1* | 4/2022 | Chauhan | G06Q 30/0202 |
| 2022/0351223 | A1* | 11/2022 | Vankadaru | G06N 20/00 |

* cited by examiner

MACHINE LEARNING WITH DATA SYNTHESIZATION

CROSS-REFERENCE TO RELATED APPLICATION

This application is a continuation of, and claims priority to, U.S. patent application Ser. No. 17/197,511, filed Mar. 10, 2021, and which is incorporated by reference herein.

BACKGROUND

Machine learning models may be used for a variety of different applications for estimating or predicting real-world conditions, causes, outcomes, or the like. Further, there are a large variety of different types of machine learning models, such as neural networks, deep learning models, predictive models, decision trees, regression models, stochastic models, and so forth. For instance, some types of machine learning models may be more suitable for modeling certain types of real world systems or conditions than other types of machine learning models. In addition, machine learning models typically all require some type of training and validation to configure the machine learning models to perform in a desired manner. However, for some applications there may not be sufficient data for obtaining an accurate desired result from the models. For example, the data may be sparse, noisy, or clustered, which can lead to inaccurate results.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
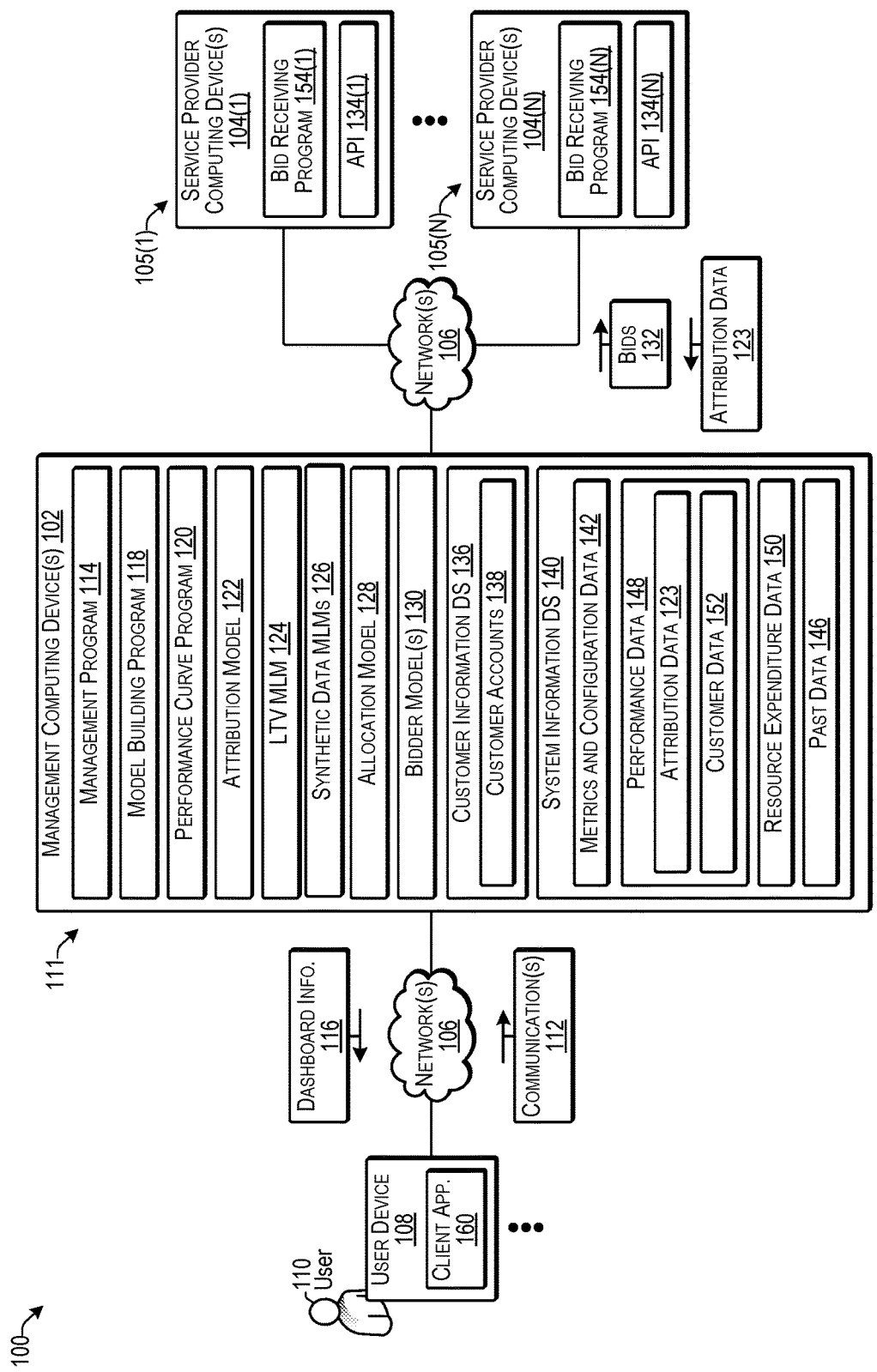
FIG. 1 illustrates an example architecture of a computing system able to configure, train, and/or execute a plurality of models in sequence according to some implementations.

Some implementations herein are directed to techniques and arrangements for generating and training a cascaded arrangement of machine learning models and other models. For instance, the system may construct, train, and validate a plurality of machine learning models for synthesizing data that can be used by other models and programs for achieving improved accuracy of the outputs of other models and programs. Accordingly, implementations herein provide improvements in machine learning technology by providing techniques for training a set of machine learning models to synthesize data that can then be used to improve the accuracy of results provided subsequently by one or more other models.

In some cases, a computing device may receive data from a plurality of groups of data sources. In some cases, the groups may correspond to marketing channels and the data sources may correspond to marketing campaigns stemming from the respective marketing channels. The computing device may create a training data set from a first portion of the received data and may create a plurality of validation data sets from a second portion of the received data. Each validation data set may correspond to a respective one of the groups of data sources. The computing device may train, using the training data set, a plurality of machine learning models configured for synthesizing data. For instance, respective ones of the machine learning models may correspond to respective ones of the groups of data sources. Further, the computing device may validate the respective machine learning models using the respective validation data set corresponding to the respective group to which the respective machine learning model being validated corresponds.

As one concrete example, workflows for determining optimal expenditures for a marketing budget may be very complex and may be based in part on large amounts of data that cannot be processed by a person such as using pencil and paper. For example, to determine optimal marketing resource expenditures, the system herein may monitor channels on which marketing resources are expended, e.g., channels on which thousands of advertising bids may be placed, and may attribute results of the advertising to one channel rather than to another channel, may determine a value of the results obtained, may compare the results to past results, and so forth, which is beyond the capabilities of a person to accomplish due to the very large amounts of data and the pure conjecture that would be required, such as for determining attribution of results, value of acquired customers, value of placing additional ads at one channel rather than another, and the like. Accordingly, implementations herein may train or otherwise configure a cascaded arrangement of models that are able to perform the above described functions more accurately and with better optimization than would be possible for a human.

For discussion purposes, some example implementations are described in the environment of one or more management computing devices in communication with one or more service provider computing devices. For example, the management computing device(s) may configure and execute a plurality of models that sequentially process data and provide instructions based on the results. At least some of the models may be machine learning models trained using a portion of the data, and at least some of the machine learning models may be trained to generate synthesized data that may be used by others of the models. Further, the machine learning models may be retrained on a regular basis based on recently received and processed data.

Further, while some examples are described in the use case of measuring the effectiveness of marketing activities and determining future resource allocation, implementations herein are not limited to the particular examples provided, and may be extended to other types of use cases, other types of computing system architectures, other types of computing environments, other types of client configurations, other types of software, other types of machine learning model configurations and training techniques, and so forth, as will be apparent to those of skill in the art in light of the disclosure herein. For example, rather than being used for tracking and controlling a marketing system, the machine learning arrangements and techniques herein may be used for tracking and controlling various other types of systems in which it is desirable to determine optimal allocation of resources for achieving optimal results, such as manufacturing systems, hydraulic systems, chemical reaction systems, and so forth.

FIG. 1 illustrates an example architecture of a computing system 100 able to configure, train, and/or execute a plurality of models in sequence according to some implementations. In the example of FIG. 1, the computing system 100 includes one or more management computing devices 102 that may communicate with one or more service provider computing devices 104 over one or more networks 106. For instance, there typically may be a plurality of sets 1-N of service provider computing devices 104(1)-104(N), each different set 1-N being associated with a different service provider 105(1)-105(N) that, in this example, provides services such as advertising services, marketing services, or the like. In addition, the management computing device(s) 102 and, in some cases the service provider computing devices 104, may be able to communicate over the one or more networks 106 with one or more user devices 108.

In some examples, the management computing device(s) 102 may include one or more servers that may be embodied in any number of ways. For instance, the programs, other functional components, and at least a portion of data storage of the management computing device(s) 102 may be implemented on at least one server, such as in a cluster of servers, a server farm, a data center, a cloud-hosted computing service, and so forth, although other computer architectures may additionally or alternatively be used. Alternatively, in other examples, the management computing device(s) 102 may be embodied, at least in part, in other types of computing devices such as in one or more workstations, desktops, laptops, stand-alone servers, or the like. An example configuration of the management computing device(s) 102 is discussed additionally below with respect to FIG. 7.

The management computing device(s) 102 may be configured to perform operations and services based on instructions received from one or more users 110. The user(s) 110 may be employees, independent contractors, owners, agents, administrators, or the like, of a first entity 111 with which the management computing device(s) 102 is associated. For instance, the first entity 111 may implement the management computing device(s) 102 in connection with providing a service to customers (not shown in FIG. 1), such as for providing goods and/or services to customers. As one example, the first entity 111 may provide a service accessible to customers online, such as through a webpage, mobile application, or the like, but implementations herein are not limited to such.

In some cases, the user 110 may send one or more communications 112, which may contain instructions or other information to cause, at least in part, the management computing device(s) 102 to execute a management program 114 that may configure the management computing device(s) 102 to perform various functions for receiving data, determining training data, configuring and training a plurality of machine learning models, deploying and executing the machine learning models and other models/algorithms, using some of the machine learning models to synthesize data, using the synthesized data and real data for determining performance obtained from expended resources, determining an optimal allocation of future resources based on the synthesized and real data, and sending instructions and information to one or more of the service provider computing devices 104 based at least in part on the determined optimal results.

In some examples, the management program 114 may provide dashboard information 116 to the user device 108 to enable the user device 108 to present a dashboard to the user 110. For instance, the dashboard may enable the user 110 to control and view information about the system 100. As one example, the dashboard may serve as a control panel for determining automated tasks that will be performed, such as for controlling task scheduling, bidding properties, system alerts, and so forth. Further, the dashboard may provide a user interface for bid publishing, controlling inputs/outputs including resource expenditures, system variables, decay constants, and the like. In addition, the dashboard may enable access to historical information, audit logs, past queries, past alerts, and past dashboard operations. Further, the dashboard may provide access to API endpoints such as to consume and save metric data from worker threads, trigger notifications or alerts, and the like.

In addition, the management program 114 may include or may invoke a model building program 118 that may be executed to generate, train, and validate the machine learning models herein. Further, the management program 114 may include or may invoke a performance curve program 120 that may construct performance curves representative of the results of various system actions, such as based on data received from various data sources. For instance, in the case of the marketing system in the example herein, the performance curves may measure and represent the results obtained from the various marketing channels and campaigns selected by the models herein as discussed additionally below, e.g., with respect to FIGS. 2-6.

The management program 114 may include, execute, or may otherwise use a plurality of models, algorithms, and the like, for performing the functions described herein. For example, the management program 114 may execute an attribution model 122, as discussed additionally below with respect to FIG. 3, configured for receiving attribution data 123 from the service provider computing devices 104. For instance, the attribution data 123 may include customer click information associated with individual customers, such as new customers and/or existing customers. Further, in some cases the attribution data 123 may include customer views and impressions in addition to customer clicks. Additionally, in some cases, the attribution data 123 may include customer click through information and customer order information, while in other cases, the customer and an order placed by the customer may be determined through other techniques, as discussed below. The attribution model 122 may use the attribution data 123 to determine particular marketing channels, subchannels, campaigns, etc., to which to attribute acquisition of a new customer and/or receipt of new orders by new or existing customers. Additional details of the attribution model are discussed below, e.g., with respect to FIG. 3.

In addition, a lifetime value (LTV) machine learning model (MLM) 124 may be executed to determine a potential customer lifetime value (LTV) for a newly acquired customer, which may predict the potential total revenue that might be generated from the relationship with the particular customer. For example, the LTV machine learning model 124 may predict the amount of value the relationship with the newly acquired customer is likely to provide to the first entity 111. The LTV machine learning model 124 may be trained on data for other customers, and may include a plurality of features for essentially comparing a plurality of attributes of a new customer with the attributes of other customers for determining the potential value of the newly acquired customer such as based in part on the determined values of the other customers. Additional details of the LTV machine learning model 124 are discussed below.

In addition, a plurality of synthetic data machine learning models 126 may be trained, validated, and executed to synthesize data for a plurality of performance curves. For example, as discussed additionally below, the performance curves may indicate the marginal value of expending additional resources for additional performance gains. More granular performance curves, such as at a data-source level (e.g., campaign level), as opposed to at a data-source-group level (e.g., channel level), may provide more accurate results for determining how to allocate resources. However, more granular performance curves, such as a campaign level, may be less accurate because the data used to generate the curves may be sparse, noisy, or tightly clustered. Accordingly, the synthetic data machine learning models 126 may be executed to generate synthetic data for individual performance curves for a large number of different data sources. The synthetic data machine learning models 126 are described additionally below with respect to FIGS. 2 and 4-6.

Furthermore, an allocation model 128 may be executed to determine an optimal distribution of resources to apply to various different data sources (e.g., marketing channels and campaigns), such as based on a plurality of performance curves generated by the performance curve program 120 for data recently received from the data sources. For example, a large number of performance curves and a target amount of total resources to expend for an upcoming time period may be input to the allocation model 128 for determining an optimal allocation of resources across a plurality of target data source groups and data sources (e.g., channels and campaigns, respectively).

In addition, one or more bidder models 130 may be machine learning models or other types of models or other programs that may determine, based on the output of the allocation model 128, a plurality of bids 132 to send to the service provider computing devices 104. As one example, the bidder model(s) 130 may determine a value of each action and a daily resource expenditure. The bidder model(s) 130 may then set a target cost per action to attempt to control the amount of resources expended on individual data source groups and data sources (e.g., channels and campaigns, respectively). As one example, in the case of bidding on advertisements, the bidder model(s) 130 may uniquely identify within the system each campaign, such as by using an ad identifier (ad ID). The bidder model(s) 130 may take into consideration bidding history, e.g. for the previous two months, three months, four months, etc. For instance, the bidder model(s) 130 may determine an amount of resources expended over the past period of time in comparison to the target cost per action to determine a simple polynomial and may apply the resources currently allocated to the particular channel or campaign to the polynomial. As another example, the bidder model(s) 130 may determine a predicted result for the allocated resources at each channel and/or campaign, and determine a predicted target cost per action based on this.

Further, in some examples, the bidder model(s) 130 may apply a combination of these two techniques, such as by determining a first target cost per action using the first technique and determining a second target cost per action using the second technique, and adjusting the second target cost per action toward the first target cost per action by a threshold percentage, or vice versa.

The management program 114 may include or may invoke a publishing function that may publish, send, provide, or otherwise communicate to the selected service providers 105, the bids 132 determined by the bidder model(s) 130 for the respective selected service providers 105. For instance, the computing device(s) 102 may communicate the bids 132 determined by the bidder model(s) 130 to respective different service provider computing devices 104 of various service providers 105 at intervals specified by the bidder model(s) 130. In some examples, the publishing function performed by the management program 114 may employ respective APIs 134(1)-134(N) corresponding to the respective different service providers 105 (1)-105(N) for sending the bids 132 to the respective service provider computing devices 104(1)-104(N). The communication of the bids 132 may cause advertisements to be placed or other marketing activities to be performed by the various selected service providers 105. Sending the bids 132 may result subsequently in the receipt of new attribution data 123 in response to services provided by the service providers 105 based on the bids 132.

The management computing device(s) 102 may store or may otherwise access various different types of data and data structures. For example, the management computing device(s) 102 may access a customer information data structure (DS) 136, which may be a database or the like and which may include customer information including a plurality of customer accounts 138, each of which may contain information about a respective customer of the first entity 111 associated with the management computing device(s) 102.

In addition, the management computing device(s) 102 may access a system information data structure (DS) 140, which may include various types of information used or generated by the programs and models executed on the management computing device(s) 102. For instance, the system information data structure 140 may include metrics and configuration data 142, past data 146, performance data 148, and resource expenditure data 150.

In this example, the volume data 148 may include the attribution data 123 received from the service provider computing devices 104, and may also include customer data 152 that may be obtained from the customer accounts 138 or from various other sources, such as an orders or sales information database (not shown in FIG. 1). For example, the customer data 152 may identify new customers that placed a first order with the first entity 111 during a preceding time period and/or may identify existing and new customers that placed orders with the first entity 111 during a preceding time period. In some cases, the preceding time period may correspond to a time period covered by the attribution data 123. As discussed additionally below, the attribution model 122 may correlate the customer data 152 with the attribution data 123 to attribute customer actions (e.g., orders) to particular service providers 105, channels, subchannels, campaigns, ads, or the like. In addition, the past data 146 may include past performance data, such as past attribution data, past customer data, past performance curves, and the like, as well as past allocation information, past bid information, past bid publishing information, and so forth.

Additionally, the resource expenditure data 150 may include past and present information about resources committed to respective data sources and data source groups, such as respective channels, service providers, campaigns, advertisements, and so forth. Further, the management computing device(s) 102 may generate or access various other types of data and may also perform various other functions, such as discussed additionally herein.

The service provider computing device(s) 104 may include one or more servers that may be embodied in any number of ways. For instance, the programs, other functional components, and at least a portion of data storage of the service provider computing device(s) 104 may be implemented on at least one server, such as a web server, a cluster of servers, a server farm, a data center, a cloud-hosted computing service, and so forth, although other computer architectures may additionally or alternatively be used. The service provider computing device(s) 104 may execute at least one bid receiving program 154 for receiving the bids 132 from the management computing device(s) 102. For example, the service provider computing device(s) 104(1) may execute a bid receiving program 154(1) able to receive bids 132 via the API 134(1). Similarly, the service provider computing device(s) 104(N) may execute a bid receiving program 154(N) for receiving bids 132 via the API 134(N), and so forth. Further, the service provider computing device(s) 104 may execute numerous other programs, web applications, web pages, and the like, as is known in the art.

Each user device 108 may be any suitable type of computing device such as a desktop, laptop, workstation, server, tablet computing device, mobile device, smart phone, wearable device, terminal, and/or any other type of computing device able to send and receive data over a network. Users 110 may be associated with the user devices 108 such as through a respective user account, user login credentials, or the like. Furthermore, the user devices 108 may be able to communicate with the management computing device(s) 102 and, in some cases, the service provider computing device(s) 104, through the one or more networks 106, through separate networks, or through any other suitable type of communication connection.

In addition, each user device 108 may include a respective instance of a client application 160 that may execute on the user device 108, and which may be configured for communicating with the management program 114 executable on the management computing device(s) 102. In some cases, the client application 160 may include a browser or may operate through a browser, while in other cases, the application 160 may include any other type of application having communication functionality enabling communication with the management computing devices 102 over the one or more networks 106. For instance, in some cases, the client application may receive the dashboard information, such as via a web application provided by the management program 114. Alternatively, the client application may be an administrator application configured for sending administrative instructions for controlling the management computing device(s) 102 and/or the management program 114 or other functional components of the management computing device 114.

The one or more networks 106 may include any appropriate network, including a wide area network (WAN), such as the Internet; a local area network (LAN), such as an intranet; a wireless network, such as a cellular network; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the management computing device(s) 102, the service provider computing device(s) 104, and the user device(s) 108 may be able to communicate over the one or more networks 106 using wired or wireless connections, and combinations thereof.

Additionally, implementations herein are not limited to any particular architecture or configuration for the system 100, and any of various other systems, architectures, frameworks, and arrangements may be employed in some examples, as will be apparent to those of skill in the art having the benefit of the disclosure herein. For example, while the functional components and data of the management computing device(s) 102 are illustrated as being co-located in the example of FIG. 1, in other examples, the data and functional components may be distributed across multiple different management computing devices 102.

Figure 2:
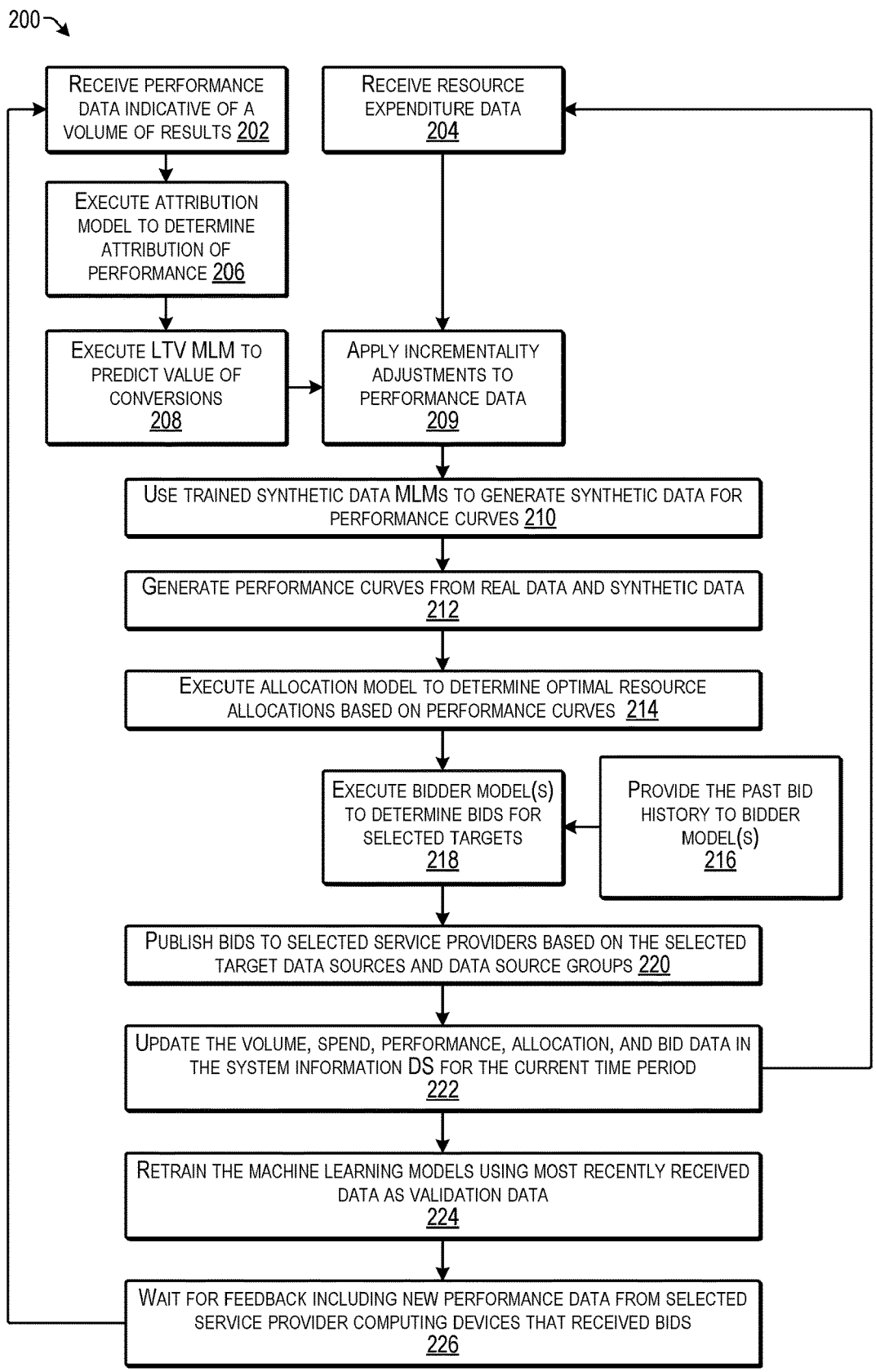
FIG. 2 is a flow diagram illustrating an example process employing a plurality of machine learning models and that includes the generation of synthetic data according to some implementations.
Figure 3:
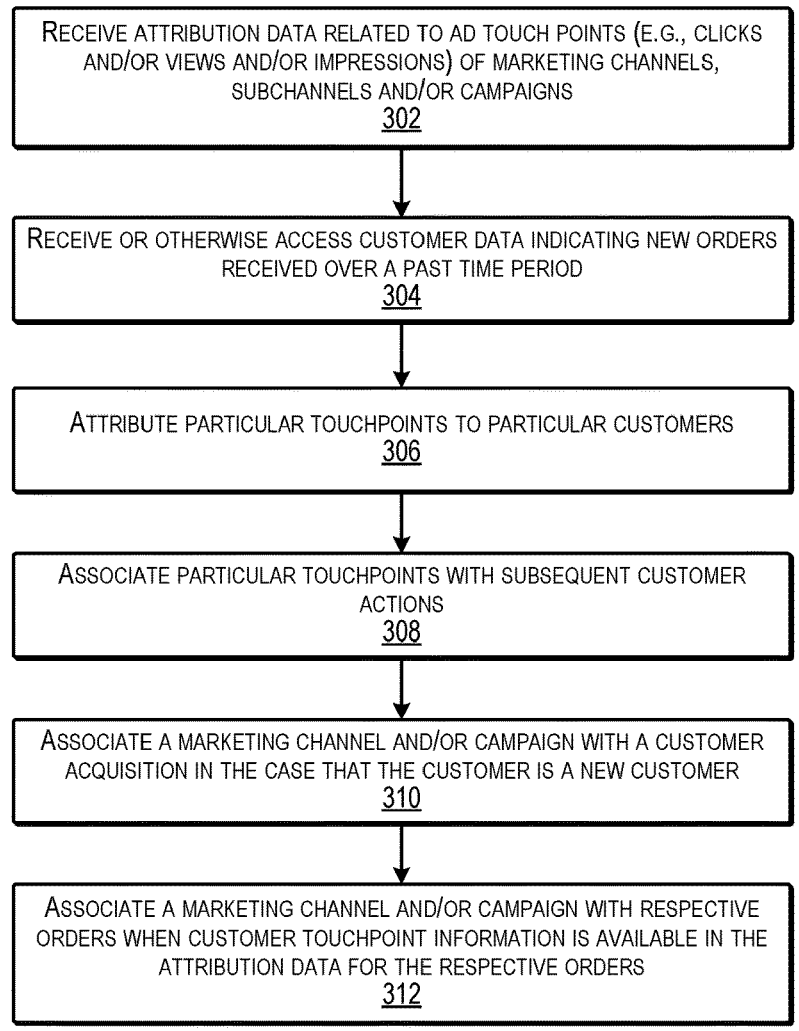
FIG. 3 is a flow diagram illustrating an example process for determining attribution according to some implementations.
Figure 6:
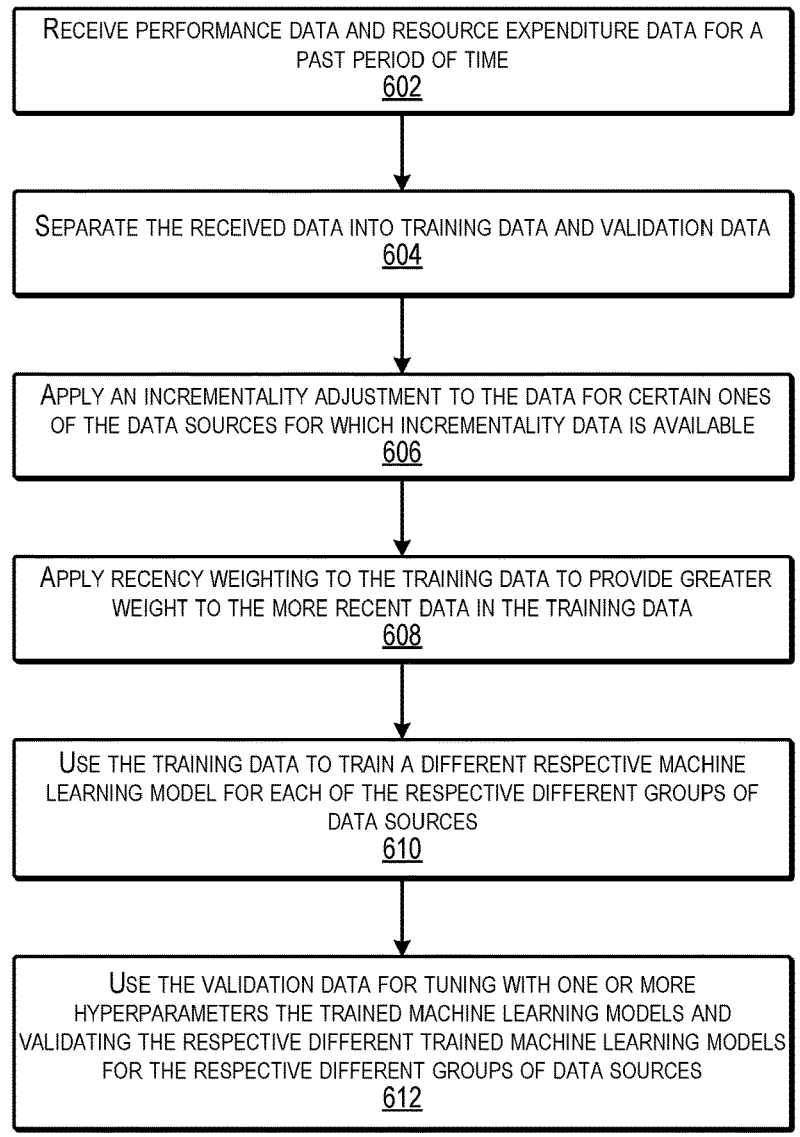
FIG. 6 is a flow diagram illustrating an example process for training the synthetic data machine learning models according to some implementations.

FIGS. 2, 3, and 6 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 2 is a flow diagram illustrating an example process 200 employing a plurality of machine learning models and that includes the generation of synthetic data according to some implementations. In some examples, the process may be executed at least partially by at least one management computing device 102, or other suitable computing device, such as by executing the management program 114, the model building program 118, and the performance curve program 162, or the like.

At 202, the computing device may receive performance data indicative of a volume of results stemming from an expenditure of resources. In some examples, the received performance data may correspond to the performance data 148 discussed above with respect to FIG. 1, and may include attribution data 123 and customer data 152. For example, the performance data may include data received from a plurality of the service providers 105 that is indicative of results achieved through the respective services provided by the respective service providers 105. For instance, in the marketing example discussed above, the received performance data may indicate the results of marketing activities, such as information related to conversions, e.g., new customers acquired over a recent period of time and/or new orders placed by customers over the recent period of time, and may further include information for attributing the conversions to particular service providers, channels, campaigns, advertisements, or the like. For example, the recent period of time may be one day, several days, one week, or the like.

At 204, the computing device may receive resource expenditure data that may indicate the resource expenditure for the recent period of time corresponding to the received performance data. For instance, the resource expenditure data may be retrieved from a storage location, such as a table, database or other data structure storing the resource expenditure data 150 discussed above with respect to FIG. 1.

At 206, the computing device may execute the attribution model 122 to determine which data source and group of data sources to which to give credit for achieving positive results indicated in the performance data. In the marketing system example, positive results may include a customer placing an order, signing up for a service or subscription, downloading an application for accessing a service or purchasing a good, and so forth. In some cases, the attribution model 122 may be a machine learning model or other type of model, such as a heuristics model, configured to associate particular customers with particular marketing campaigns, marketing channels, service providers, or the like. For example, customers may be exposed to the service offered by the first entity 111 from a number of different types of media, advertisements, marketing campaigns, marketing platforms, or the like. Accordingly, the attribution model may be configured to determine which of these or which combination of these marketing activities may have resulted in the customer performing an action that provides a positive result. An example attribution process that may be executed by the attribution model 122 is discussed below with respect to FIG. 3.

At 208, the computing device may execute the lifetime value (LTV) machine learning model 124 to determine a potential customer lifetime value for each newly acquired customer determined by the attribution model in block 206. For example, lifetime value may provide a prediction of the potential revenue benefit to the first entity 111 that may result from the relationship with the newly acquired customer. For instance, different customers may be likely to use the service more frequently or less frequently for various reasons, and consequently have greater or lesser lifetime value.

In some cases, quantifying lifetime value may include forecasting future activity and may be based in part on a projected monetary value of a customer relationship, such as based on the present value of the projected future cash flow from the customer relationship. Lifetime value may also be related to an upper limit on resource expenditure to acquire new customers and may be correlated to calculating payback of resources expended on marketing activities. For example, by identifying customers that are more likely to generate higher revenue and by determining the advertisements or other marketing activities that attracted those higher value customers, the system is able to better determine how to spend a future marketing budget. The LTV machine learning model 124 may be trained using historical data such as based on revenues generated from various customers correlated with customer attributes determined for the respective customers. Examples of customer attributes may include customer interactions with the service, customer activities, customer interests, and so forth. Accordingly, the LTV machine learning model may be trained to predict the lifetime value of each customer based on various disparate pieces of information that may be determined about each customer, such as through the customer account and/or through information obtained about the customer from the service providers.

At 209, the computing device may access incrementality adjustment data that may be used to adjust some of the received performance data before generating the performance curves. For example, incrementality may refer to an incremental measure of acquiring a new customer or receiving a new order based on resource expenditure for a particular campaign as compared to the overall conversion rate. The incrementality may indicate the percentage of conversions that are received as a direct result of a particular campaign. In some examples herein, an incrementality adjustment table or other data structure may be determined empirically, such as by monitoring actions of A/B test groups of consumers for various types of advertisements, campaigns, channels, and so forth. The incrementality table may be subsequently used to adjust the received performance data.

As one example, experimentally measured incrementality multipliers may be applied to the respective data that will be used for generating the performance curves which may bring the attributed orders and customer conversion more closely into alignment with the results of empirical incrementality tests performed for various channels. As one example, the empirical incrementality may indicate the difference in volume when a particular channel is utilized versus when the particular channel is not utilized. Accordingly, in some cases, the attribution of some results may be adjusted with an adjustment constant that is based on the difference between the incrementality test and the attribution determined for the particular channel. For example, each channel's volume (e.g., number of positive results) may be multiplied by the adjustment constant.

At 210, the computing device may use the synthetic data machine learning models 126 to generate synthetic data for performance curves. For example, the computing device may input the received real data (e.g., adjusted for incrementality) into the synthetic data machine learning models 126 of the respective data source group (e.g., respective channel) from which it was received for generating synthetic data for each of the data sources (e.g., campaigns) from which the real data is received. For example, each of the synthetic data machine learning models 126 may be trained to generate an optimal amount of synthetic data for the respective campaigns of the respective channel for which the respective synthetic data machine learning model 126 has been trained. Additional details of the synthetic data machine learning models are discussed below, e.g., with respect to FIGS. 4-6.

At 212, the computing device may construct performance curves for each of the data sources within each of the data source groups. For example, as discussed below with respect to FIG. 4, each of the performance curves may represent the relationship between the performance data received from the respective data source and the resources expended on the respective data source (e.g., a particular campaign). The performance curves may be constructed by including the synthetic data when generating the curve to provide a more accurate curve representative of the real data received from each of the data sources.

As one example, the computing device may execute the performance curve program 120 that generates performance curves that represent an expenditure of resources required for achieving positive results (e.g., acquiring new customers or new orders). The performance curves may be generated for each of the data sources from which the performance data is received. In some examples, the data sources may be campaigns within specific channels. In some examples, the performance curve program 120 may include a function for generating synthetic data using the synthetic data machine learning models 126 that can be used for better fitting performance curves as discussed additionally below. For instance, the performance curve program 120 may be configured to construct a different performance curve based on the data received from each campaign. In addition, in some examples, the performance curve program 120 may also construct a respective performance curve for each of the data source groups (e.g., for each channel) in addition to constructing a curve for each data source (campaign). In some cases, there may be sufficient real data such that synthetic data is not needed when constructing performance curves for the data source groups. However, in other cases, the synthetic data machine learning models may also be used for generating synthetic data for the performance curves for the data source groups (channels).

At 214, the computing device may employ the allocation model 128 for determining the allocation of future resources based on the recently received performance data. The allocation model 128 may receive, as input, the performance curves and an indication of an amount of resources to be allocated across the data sources corresponding to the performance curves. In some examples, the allocation model 128 may have limits on the amount of change allowable over previous allocations to the respective data sources, such as to prevent large swings in the amount of resources allocated to any particular one of the data sources (e.g., campaigns) or groups of data sources (e.g., channels) or to particular service providers 105. The limits may prevent undesirable results from occurring at the various service providers 105 or the like.

As one example of the allocation model 128, the resources may be allocated incrementally to the performance curves having the steepest slopes. As more resources are allocated to particular curves, the point of the slope will move up the curve and the slope will tend to flatten. When the resources allocated across all of the performance curves are at respective points on each of the respective performance curves having generally the same slope, then the allocation of the resources may be determined to be optimally allocated. For example, since the slope is representative of the amount of increased performance versus the amount of increased resources, adding additional resources to any one of the data sources when the slopes are all approximately equal will result in approximately the same amount of increased performance. In some cases, the allocation model 128 may generate target resource expenditure recommendations at a selectable level of granularity, such as per service provider, per channel, per campaign, per advertisement, or the like. Further, each selected data source (e.g., campaign, advertisement, etc.) may be assigned a separate identifier that is unique within the system to enable tracking of data associated with that particular data source.

At 216, the computing device may provide the past bid history and other parameters to the bidder model(s) 130. For example, the past bid history and other parameters may indicate the amounts previously bid on the various channels and campaigns for the various service providers specified by the allocation model 128.

At 218, the computing device may execute one or more bidder models 130 that may determine bids for various different target service providers, data source groups (channels), and data sources (campaigns) or the like. In some cases, there may be a different bidder model 130 for each different service provider (e.g., GOOGLE, FACEBOOK, SNAPCHAT, APPLE, etc.). In some examples, the bidder model(s) 130 may be machine learning models, while in other examples, the bidder model(s) 130 may be other types of models such as heuristic models, algorithms, or the like. The bidder model(s) 130 may be configured to determine optimal bids to submit to a particular service provider 105 to obtain a requested service, such as for purchasing various different types of advertisements or the like. As one example, search engine marketing platforms may employ a bidding system in which companies desiring to place advertisements place bids on certain keywords and audiences. Winning bids may generally be ranked higher in search results returned by the search engine to search engine users, or may receive more prominent placement for viewing by a potential customer. Further, other types of channels may use different techniques for advertisement placement, such as embedding clickable advertisements into webpages, mobile applications, etc., but still may select advertisements for more favorable placement based on winning bids received from entities desiring to place ads.

At 220, the computing device may publish, send, provide, or otherwise communicate to the selected service providers, the bids determined for the respective selected service providers. For instance, the computing device may execute a publishing function of the management program 114 to communicate the bid amounts determined by the bidder model(s) 130 to respective different service provider computing devices 104 of the respective service providers 105 via respective APIs 134 used by the respective service providers 105 for placing the bids for respective advertisements with the respective service provider 105. The communication of the bid amounts may cause advertisements to be placed or other marketing activities to be performed by the various selected service providers.

At 222, the computing device may update the data in the system information data structure 140, such as by updating the performance data 148, the past data 146, the resource expenditure data 150, and the metrics and configuration data 142. For instance, the computing device may maintain the system information data structure 140, or may send the information to one or more other computing devices that maintain the system information data structure 140, or portions thereof. For instance, in the case that the information is maintained in a large relational database, a separate database management computing device may receive the information.

At 224, the computing device may retrain the machine learning models in view of the received data. For example, at least some of the machine learning models, such as the synthetic data machine learning models 126 may be retrained on a regular basis, such as every day, every several days, every week, every two weeks, every month, etc., so that the machine learning models are trained on the most recently available training data. Further, in the case that the attribution model 122, allocation model 128 and/or the bidder model(s) 130 are machine learning models, these machine learning models may also be retrained at the same interval or at different intervals. As one example, the synthetic data machine learning models 126 may include a separate model trained for each separate channel. Training the synthetic data machine learning models 126 may include pooling data across all channels for a selected time period (e.g., past 2 months, 3 months, 6 months, etc.) and using the pooled data as the training set for each channel's respective model. In addition, hyperparameters may be optimized for each channel's model on a channel-specific validation set that may include the most-recently received data for that particular channel. Additional details of building and training the synthetic data machine learning models 126 are discussed below, e.g., with respect to FIG. 6.

At 226, the computing device may wait to receive feedback including new performance data from the various selected service provider computing devices that received bids for placing advertisements. For example, the feedback may be new performance data that indicates the positive results from the advertisements for which bids were submitted for the respective service platforms. When a sufficient volume of new performance data is received and/or after the elapse of a threshold time, such as one week, the process 200 may return to block 202 to repeat.

FIG. 3 is a flow diagram illustrating an example process 300 for determining attribution according to some implementations. In some examples, the process may be executed at least partially by the management computing device(s) 102, or other suitable computing device, executing the management program 114 and the attribution model 122, or the like.

As mentioned above with respect to FIGS. 1 and 2, the attribution model 122 may be executed to determine how to assign positive results, such as customer acquisitions and/or customer orders, to one or more of the service providers, channels, and campaigns selected by the management computing device 102. For example, touchpoints (customer clicks and, in some cases, customer page views or impressions) of a newly acquired customer may be mapped to an associated channel and campaign of a respective service provider 105. This can make it possible to attribute newly acquired customers to one or more of the channels to better determine the effectiveness of individual channels in comparison to a plurality of channels engaged by the system.

At 302, the computing device may receive attribution data 123 related to advertisement touch points (e.g., clicks and/or views and/or impressions) of marketing channels, subchannels and/or campaigns from service providers 105. For example, a channel may correspond to a marketing media type such as "search engine", "social media", "offline", "display", etc., and a subchannel may correspond to a subset of a media type. For instance, the "display" channel may include subchannels such as "application display" and "web display". In addition, campaigns may be individual advertisements or groups of advertisements provided in a selected channel and, when applicable, subchannel. For example, "clicks" may indicate that the consumer clicked on, tapped, or otherwise selected an advertisement. Furthermore, in some examples, in addition to customer clicks, the touchpoints in the attribution data 123 may include views and/or impressions attributable to particular customers.

At 304, the computing device may receive or otherwise access customer data 152 that indicates new orders received over a past time period. For instance, the customer data 152 may be obtained from the customer information data structure 136 or any of various other databases, data structures, or the like, maintained by the first entity 111. As one example, the customer data 152 may be used to identify new customer accounts and orders that may be cross referenced with the customer touchpoints received in the attribution data 123, such as in the case that the attribution data 123 does not include sufficient information about the customer order or other customer information.

At 306, the computing device may attribute particular touchpoints to particular customers. Furthermore, in some examples, views and/or impressions may be attributed to particular customers in addition to clicks. As one example, urchin traffic monitoring (UTM) codes may be generated using a predetermined naming convention when a customer clicks on an advertisement. For instance, a UTM code may be a piece of code added to the end of a URL (uniform resource locator) to track the performance of campaigns and ad content. A UTM code may enable tracking of URL parameters such as source, medium, campaign, term, and content. Accordingly, the UTM codes may be used for tracking potential new customers or existing customers when the customers touch, swipe or otherwise click on an advertisement on a webpage. A similar technique may be applied to tracking customer clicks within mobile applications. In the simplest case, referred to as a "click through", a customer may click on an ad, be directed to the first entity's website or mobile application, and may proceed to place an order. In other cases, various cross-referencing techniques may be applied for correlating customer actions with respect to advertisements with a customer account created by the customer at the first entity, the effectiveness of which may depend in part on the tracking capabilities provided by the individual service providers.

At 308, the computing device may associate particular touchpoints with subsequent customer actions such as placing an order, making a purchase, signing up for a service, or the like. In some examples, the touchpoints associated with a particular customer order or other customer action may be limited to those detected during a threshold time period before the customer action, such as during a preceding week, preceding two weeks, preceding three days, the last 24 hours, or the like. As one example, when a match can be made between customer touchpoints and a customer order, the most recent customer touchpoint (e.g., click, view, or impression) within a threshold time prior to placement of a particular order by the customer may be associated with the order for attribution purposes. For instance, in the case that the customer is a new customer, the most recent touchpoint may be associated with the customer acquisition (conversion) of that customer.

At 310, the computing device may associate a marketing channel and/or campaign with the customer acquisition in the case that the customer is a new customer. For example, the marketing channel/subchannel and/or campaign that provided the particular touchpoint information associated with the new customer at block 308 above may be the marketing channel/subchannel and campaign (data source) associated with acquisition of the new customer. As one example an attributed customer acquisition volume table, database, or other data structure may be maintained with the system information data structure 140 and may keep track of channels and subchannels and customer acquisitions attributable to particular ones of those channels/subchannels, campaigns, and service providers 105.

At 312, in some examples, regardless of whether the customer is an existing customer or a new customer, when an attribution can be made between a customer touchpoint and a customer order, the computing device may associate an individual order with a marketing channel/subchannel and campaign that provided the most recent touchpoint prior to the timing of placement of the order and within a threshold time. Thus, in some cases, the most recent customer touchpoint (click, view, or impression) detected prior to a particular order by the customer may be associated with the order for attribution purposes. Further, an attributed order volume table, database, or other data structure may be maintained that keeps track of orders attributable to particular ones of the service providers, channels, subchannels, campaigns, etc.

Figure 4:
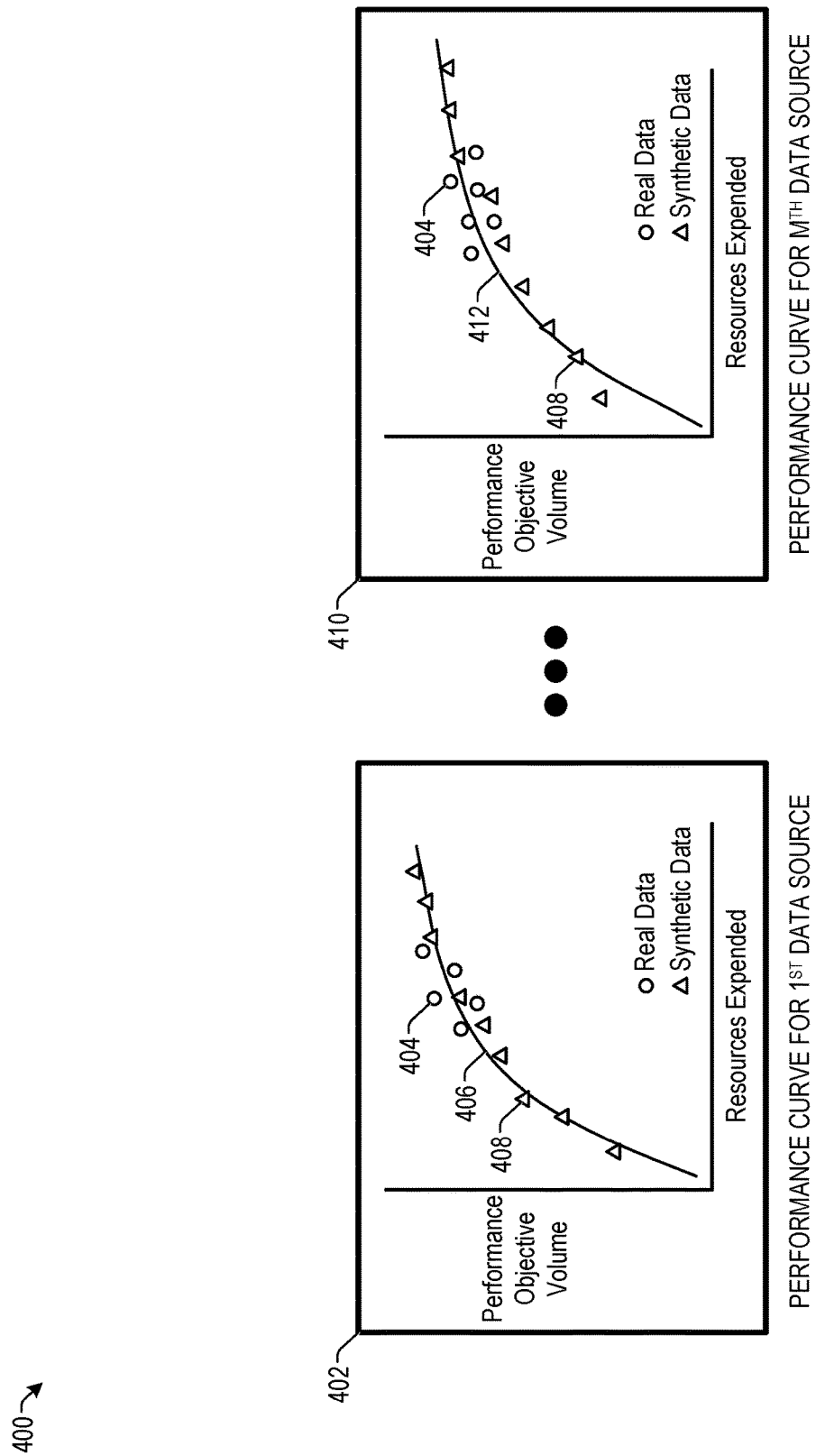
FIG. 4 illustrates example performance curves that may be generated based on actual data and synthetic data according to some implementations.

FIG. 4 illustrates example performance curves 400 that may be generated based on actual data and synthetic data according to some implementations. As mentioned above, the attribution data may indicate which data sources (e.g., channels and campaigns) are viewed, clicked on, etc., by people before they become customers. Further, based on the attribution data, the system herein may assign credit to at least one of the service providers and marketing channels for converting the person into a customer (i.e., a conversion), which may be a performance objective. The attribution data and the volume of the performance objectives (conversions) may be used to generate performance curves 400 at various levels of granularity, such as service provider level, channel-level, campaign-level, and so forth. For instance, a performance curve 400 may be a graph that shows how the performance objective volume corresponds to resource expenditures. In the case of a marketing system example, the performance objective volume may correspond to the number of conversions, and the resources expended may correspond to a spend amount.

The performance curves 400 may indicate the marginal value of expending additional resources for additional performance gains. More granular performance curves, such as at a campaign level (as opposed to a channel level), may provide superior results for determining how to allocate resources. However, more granular performance curves, such as the campaign level, may be less accurate because the data used to generate the performance curves 400 may be sparse or may be noisy. For some channels, such as in the case of search engine marketing, there may be a large number of campaigns (e.g., hundreds or thousands) that correspond to a small amount of resource expenditures every week. Thus, the weekly attribution data may be noisy, and during some weeks, some of these campaigns may not receive any resource expenditures, which may make the data sparse. Accordingly, using just the real data as-is may result in unreliable performance curves and, ultimately, suboptimal allocation of resources.

For other types of campaigns, the data may be clustered in a narrow band of resource expenditures. For example, some larger campaigns may consume only high amounts of resources at a consistent expenditure point, and may lack historical data in the lower or higher resource expenditure ranges. This can result in clustered data that can make the performance curve 400 unreliable and highly sensitive to small variations in changes in resources expended. If the performance curves are unreliable and unstable, the resource allocation determined based on the performance curves may also be sub-optimal and unstable.

Accordingly, to provide more accurate performance curves 400 at a desired level of granularity, implementations herein may train and validate the synthetic data machine learning models 126 with the ability to generate synthetic data that can be used in combination with the real data to generate accurate performance curves at the desired granularity. For example, the performance curves 400 herein may be generated at a granularity of the data source (e.g., at the level of the campaign that resulted in the touchpoints and conversions) that corresponds to the performance objective data being graphed to generate the respective curve. The increased accuracy of the performance curves 400 at the more granular level enables the allocation model 128 to more optimally allocate future resources with improved accuracy, e.g., at the campaign level, rather than at the channel level or service provider level. Accordingly, the operation of the allocation model 128 is substantially improved by the synthetic data generated by the synthetic data machine learning models 126.

In the illustrated example, a first performance curve 402 may graph performance objective data for a first data source (e.g., a first advertising campaign). Real data points indicated by circles 404 represent the number (volume) of performance objectives achieved at various expenditures of resources. However, as there are only five real data points available from the first data source, the actual shape of the curve 406 may be uncertain without the inclusion of synthetic data points indicated by triangles 408. Similarly, an Mth performance curve 410 may include a curve 412 generated for an Mth data source (e.g., an Mth campaign). The synthetic data points 408 generated for the Mth performance curve 410 may differ from those generated for the first performance curve 404, such as based on differences in the real data for each of these performance curves 404, 410, as input to the synthetic data machine learning models 126. Additional details of building, training and validating the synthetic data machine learning models are discussed below with respect to FIGS. 5 and 6.

Figure 5:
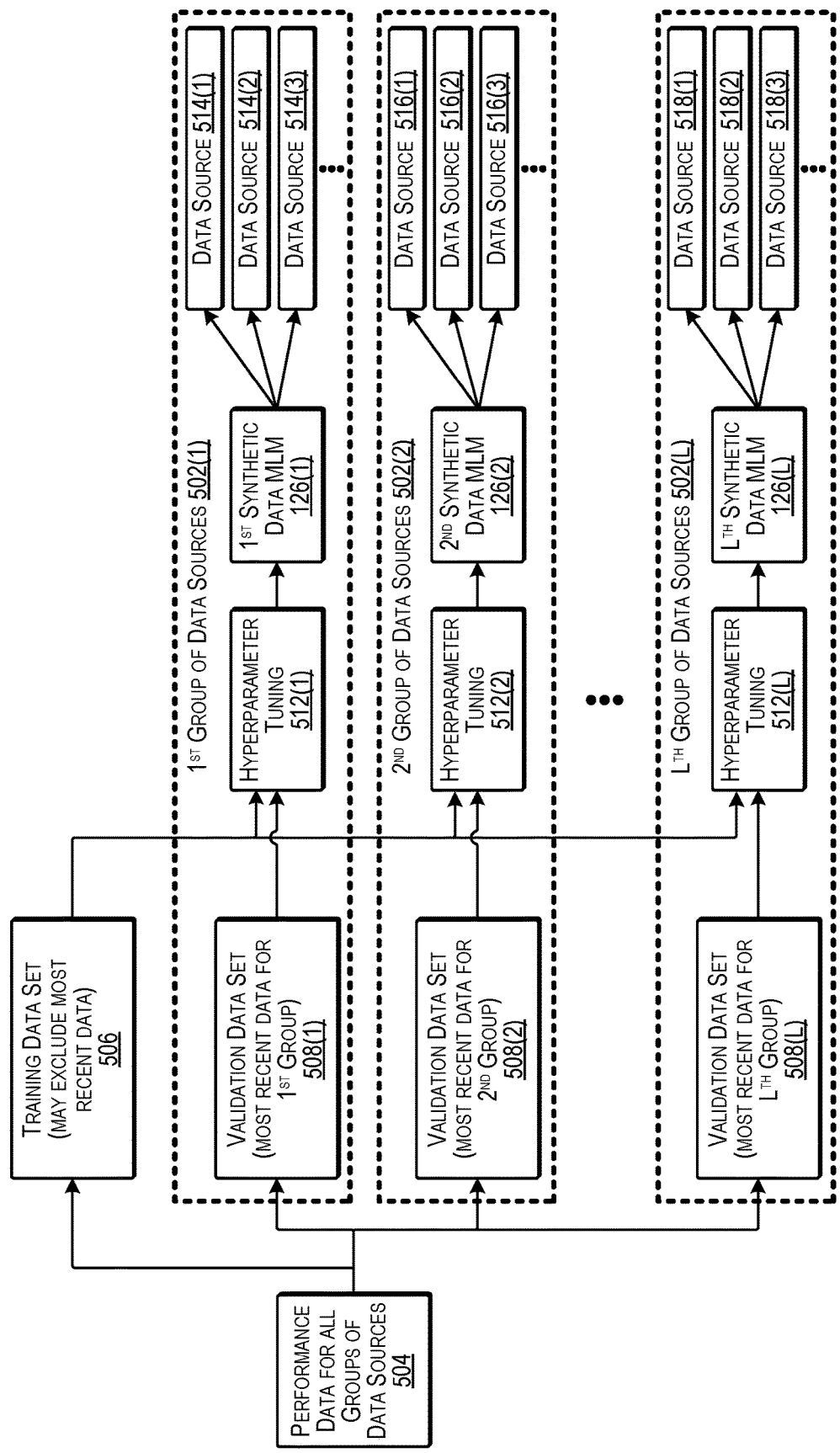
FIG. 5 is a block diagram illustrating an example logical arrangement for building, training, and validating a plurality of synthetic data machine learning models according to some implementations.

FIG. 5 is a block diagram illustrating an example logical arrangement 500 for building, training, and validating a plurality of synthetic data machine learning models 126 according to some implementations. In this example, the management computing device(s) 102 may train one respective synthetic data machine learning model 126 per channel, such as by execution of the model building program 118 discussed above with respect to FIG. 1. For example, if there are L data source groups (channels), where L is an integer, then the computing device may train L synthetic data machine learning models 126, such as a first synthetic data machine learning model 126(1), a second synthetic data machine learning model 126(2), . . . , an Lth synthetic data machine learning model 126(L), i.e., one synthetic data machine learning model 126 for each different group of data sources 502(1), 502(2), . . . , 502(L), which may each correspond to a different marketing channel in some examples.

For training the synthetic data machine learning models 126, the management computing device(s) 102 may access performance data 504 for all of the groups of data source (e.g., all channels) such as all of the performance data for a threshold past period of time (e.g., the past month, past two months, past three months, past year, etc.). The management computing device(s) 102 may divide the performance data into a training data set 506 and a plurality of validation data sets 508. For example, the training data set 506 may exclude the most recent data, e.g., data received over a recent period of time, such as past one week, two weeks, 3 days, etc. Further, the validation data sets 508 may include the most recent data for only their corresponding data sources, and may exclude data from other groups of data sources 502. Accordingly, the validation data set 508(1) may include the most recent data received for the first group of data sources 502(1), the validation data set 508(2) may include the most recent data received for the second group of data sources 502(2), and the validation data set 508(L) may include the most recent data received for the Lth group of data sources 502(L). Thus, in the marketing example discussed above, each validation data set 508 may include data received only from campaigns for that particular channel, whereas the training data set 506 may include data received from all of the channels used over the threshold past period of time.

During training, each synthetic data machine learning model 126 may be trained with the training data set 506 for all the groups of data sources (e.g., all channels). The different respective validation sets 508(1), 508(2), . . . , 508(L) may be used for hyperparameter tuning 512(1), 512(2), . . . , 512(L) for each different synthetic data machine learning model 126(1), 126(2), . . . , 126(L), for each different group of data sources 502(1), 502(2), . . . , 502(L), respectively. For instance, the validation set for a channel may include the recent data for each data source (e.g., campaign) in that group of data sources (channel), which can emphasize recent performance. In this example, a first plurality of data sources (e.g., campaigns) 514(1), 514(2), 514(3), . . . , are associated with the first group (channel) 502(1); a second plurality of data sources 516(1), 516(2), 516(3), . . . , are associated with the second group 502(2); and an Lth plurality of data sources 518(1), 518(2), 518(3), . . . , are associated with the Lth group 502(L).

Furthermore, some types of campaigns may benefit more than others from learning about different channels. For instance, for similar group types (e.g., similar channel types), the data may be more similar than for dissimilar group types (e.g., dissimilar channels) and therefore one of these group types that has a smaller amount of data my benefit from being trained with data from a more similar group type that has a larger amount of data. As a concrete example, if a large amount of data is available from a first channel corresponding to ads placed at a first search engine, then a synthetic data machine learning model 126 for a second (different) channel corresponding to ads placed at a different search engine for which a smaller amount of data is available may be trained to be more accurate by also using the data from the first channel because the channels are similar and the behavior and results received from the two channels may also be expected to be similar. Likewise, social media ads may typically have characteristics that are similar to each other, display channel ads may have characteristics that are similar to each other, and so forth, and may benefit more by training with the data from more similar channels (similar data groups).

During training of the synthetic data machine learning models 126, the similarity or difference between data groups may be accounted for at the group level (e.g., channel level). For instance, each synthetic data machine learning model 126 may have a set of weights $W_{1 \rightarrow L}$ associated with it for weighting the influence of the data of each of the other groups of data sources (channel). The weights may be included in a loss function for each synthetic data machine learning model 126 and the weights may be tuned as hyperparameters during training. The weight W for the data of the group 502 of the model 126 being trained may be set to "1" and the weights W for all the other groups 502 may be set to a value between 0 and 1 depending on whether the data of the other groups 502 will be useful to the particular model being trained. For example, if the model 126(1) of the group of data sources 502(1) may benefit from learning from group 502(2) data sources, then the weight "$W_2$" that corresponds to the data from group 502(2) may be assigned a higher value. This allows each group's synthetic data machine learning model 126 to determine the degree to which it uses data from other groups 502. To tune hyperparameters, some examples herein may use sequential hyperparameter optimization.

In some cases, the similarity between data groups can be determined empirically. For example, different weights may be applied to different portions of the training data based on the respective group with which the respective data portion is associated. By varying the weights during hyperparameter tuning, and measuring whether the accuracy of the resultant cost curve modeling improves or not, the similarity and appropriate weights to use for the data of each data group may be determined with respect to the other data groups. Alternatively, if there is no benefit, then all the weights may come out to be the same value. Furthermore, while similarity between channels is provided as one example above, similarities based on other considerations may additionally or alternatively be used. As one example, similarity weighting may be applied based on similar ad content (e.g., text, images, etc.) that is used across different channel types. For instance, two channels with similar ad content may benefit more from learning about each other than from channels having ads with dissimilar ad content even though the channel types may otherwise be not particularly similar. Another such consideration in addition to, or as an alternative to, ad content may be for ads targeting similar geographic regions.

In addition, even within a respective group 502, the data sources (campaigns) may vary greatly in the amount of synthetic data that is beneficial to them, so the computing device may further tune the number of synthetic data points used. For instance, when generating synthetic data, there may be a tradeoff, e.g., if the synthetic data machine learning models 126 generate too much estimated data, then the synthetic data may drown out the signal from the real data. On the other hand, if an insufficient amount of estimated data is generated, then the performance curves may be significantly inaccurate. The optimal number of synthetic data points to generate may vary by data source (campaign). For instance, some data sources may have a sufficient amount of accurate real data and may need little or no synthetic data, while other data sources may have sparse or closely clustered data and the performance curves of these data sources may benefit substantially from synthetic data.

To determine the optimal amount of synthetic data for a particular data source, the computing device may try a range of different values. For each value, the computing device may generate that many synthetic data points, fit the performance curve, and evaluate the accuracy of the curve based on the validation set 508 for that group 502 of data sources (channel). As one example, the computing device may perform a grid search (or random search, binary search, or the like) and select the value that produces the most accurate performance curve, e.g. by minimizing the performance curve loss function on the data points of the validation data set 506. In the marketing example, for some channels, there may be thousands of campaigns; however, as each evaluation and validating process for the individual campaigns may be executed independently of the others, the optimization and evaluation processes may be executed in parallel in some examples, such as by using a plurality of management computing devices 102.

FIG. 6 is a flow diagram illustrating an example process 600 for training the synthetic data machine learning models 126 according to some implementations. In some examples, the process may be executed at least partially by the management computing device(s) 102, or other suitable computing device, executing the management program 114 and the model building program 118, or the like. In some examples, the process 600 may correspond to block 224 of FIG. 2 discussed above.

At 602, the computing device may receive performance data and resource expenditure data for a threshold past period of time. For example, the past period of time may be the past two months, three months, four months, six months, year, etc. As one example, in the case of the marketing system described above, the performance data may include conversions attributable to each campaign for each channel over the threshold period of time and an amount of resources expended over the threshold period of time for each of the campaigns, channels, and so forth.

At 604, the computing device may separate the received data into training data and validation data. For example, a threshold amount of the data, e.g., the most recently received data may be set aside as validation data, and the remaining data may serve as the training data. As mentioned above, the most recent data may be data received within the past week, past two weeks, past several days, or the like. Further, the validation data may be grouped according to the data source group of the data. For example, in the case that the performance data is received from a plurality of marketing campaigns corresponding to a plurality of respective marketing channels, the validation data may be grouped according to the respective channels, i.e., data received from a first set of campaigns of a first channel is grouped as validation data for tuning a first machine-learning model 126 to use for generating synthetic data for the first channel campaigns; data received from a second set of campaigns of a second channel is grouped as validation data for tuning a second machine learning model 126 to use for the second channel campaigns, and so forth.

At 606, the computing device may apply an incrementality adjustment to the data for certain ones of the data sources or data groups for which incrementality data is available. For instance, the computing device may apply an empirically determined incrementality multiplier having a value between 0 and 1 to the data from some of the channels and/or campaigns to cause the training data and the validation data to resemble more closely the empirically determined data.

At 608, the computing device may apply recency weighting to the training data to provide greater weight to the more recent data in the training data. As one example, exponentially decaying weights may be applied to the training data based on recency to give more weight to more recent data. For instance, a decay constant "d" between 0 and 1 may be specified for all the data sources, per group of data sources, or the like. For example, the age in weeks may be applied as an exponent to the decay constant, e.g., one to two weeks old=$d^0$, two to three weeks old=$d^1$, three-four weeks old=$d^2$, and so forth.

At 610, the computing device may use the training data to train a different respective synthetic data machine learning model 126 for each of the respective different groups of data sources. For instance, in the case of marketing channels, the computing device may train a respective synthetic data machine learning model 126 to generate synthetic data for the campaigns included in that channel. Accordingly, in some examples, as discussed above, e.g., with respect to FIG. 5, there may be a separate machine learning model 126 trained for each separate group of data sources (e.g., each separate channel or, in other examples, each separate subchannel). As mentioned above, the training data may be data received across all of the groups of the data sources (e.g., data received from all of the marketing channels utilized by the first entity). Furthermore, some types of campaigns may benefit more than others from learning about different channels. Accordingly, to account for this, weights may be applied to the data from other channels, such as through hyperparameters for tuning the respective synthetic data machine learning models 126 when training with data for the various different channels.

At 612, the computing device may use the validation data for tuning as one or more hyperparameters the trained machine learning models 126 and validating the respective different trained machine learning models 126 for the respective different groups of data sources. For example, the validation data for each channel may include the recent data (e.g., past several days, past week, past two weeks, etc.) for each campaign in that channel, which may emphasize recent performance.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
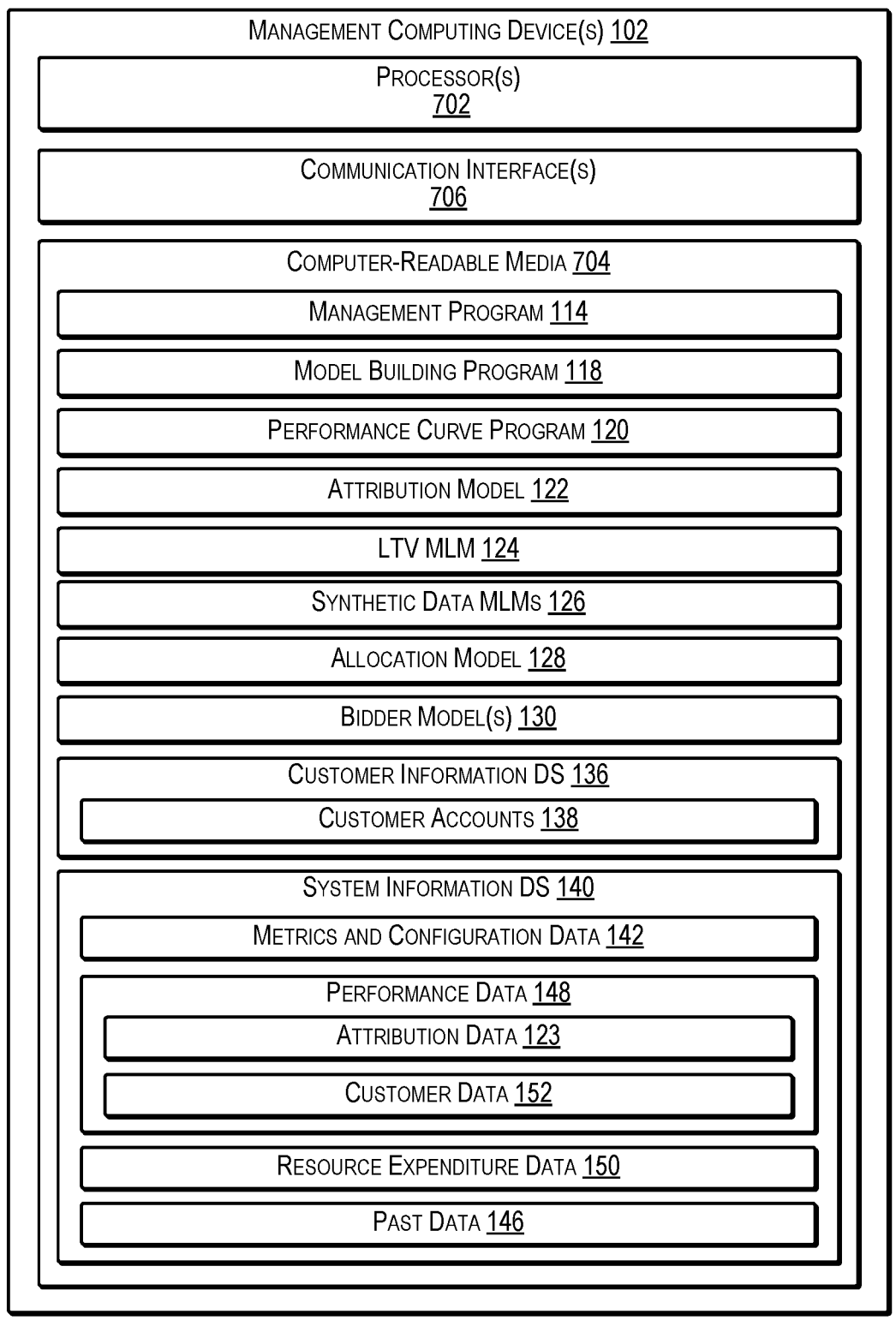
FIG. 7 illustrates select example components of the management computing device(s) that may be used to implement at least some of the techniques and functions described herein.

FIG. 7 illustrates select example components of the management computing device(s) 102 that may be used to implement at least some of the techniques and functions described herein. The management computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple management computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the management computing device(s) 102 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, digital signal processors, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the management computing device(s) 102, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the management computing device(s) 102, while in other examples, the computer-readable media 704 may be partially remote from the management computing device(s) 102 such as at a network location accessed over the one or more networks 106.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the management computing device(s) 102. Functional components stored in the computer-readable media 704 may include the management program 114, the model building program 118, and the performance curve program 120, as discussed above, each of which may include one or more computer programs, applications, modules, executable code, or portions thereof.

In addition, the computer-readable media 704 may store models, such as machine learning models or other types of models. Models stored in the computer-readable media 704 may include the attribution model 122, the LTV machine learning model 124, the synthetic data machine learning models 126, the allocation model 128, and the bidder model(s) 130. Examples of machine learning models that may be used in some examples herein may include any of a variety of types of machine learning models, including classification models such as random forest and decision trees, regression models, such as linear regression models, predictive models, support vector machines, stochastic models, such as Markov models and hidden Markov models, deep learning networks, artificial neural networks, such as recurrent neural networks, and so forth.

In addition, the computer-readable media 704 may store data, data structures, and other information used for performing the functions and services described herein. For example, the computer-readable media 704 may store the customer information data structure 136 including the customer accounts 138, and may also store the system information data structure including the metrics and configuration data 142, the past data 146, the performance data 148, including the attribution data 123 and the customer data 152, and the resource expenditure data 150. The management computing device(s) 102 may also include or maintain other functional components and data, which may include an operating system, programs, drivers, etc., and the data used or generated by the functional components. Further, the management computing device(s) 102 may include many other logical, programmatic, and physical components, of which those described above are merely examples that are related to the discussion herein.

The one or more communication interfaces 706 may include one or more software and hardware components for enabling communication with various other devices, such as over the one or more network(s) 106. For example, the communication interface(s) 706 may enable communication through one or more of a LAN, WAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In addition, in some examples, service provider computing device(s) 104 and/or the user computing devices 108 may have hardware and software configurations similar to that of the management computing device(s) 102, but with different functional components, such as described above, e.g., with respect to FIG. 1.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
    one or more processors configured by executable instructions to perform operations including:
        receiving, by the one or more processors, data from a plurality of groups of data sources;
        accessing, by the one or more processors, a plurality of data synthetization machine learning models configured for generating synthetic data, respective ones of the data synthetization machine learning models corresponding to respective ones of the groups of data sources;
        generating first synthetic data by inputting, to a first one of the data synthetization machine learning models, first data received from a first data source corresponding to a first group of data sources for which the first data synthetization machine learning model is trained;
        generating second synthetic data by inputting, to a second one of the data synthetization machine learning models, second data received from a second data source corresponding to a second group of data sources for which the second data synthetization machine learning model is trained;
        determining a first graph using the first data received from the first data source and the first synthetic data generated by the first data synthetization machine learning model;
        determining a second graph using the second data received from the second data source and the second synthetic data generated by the second data synthetization machine learning model; and determining an allocation of resources based at least in part on comparing the first data and the first synthetic data with the second data and the second synthetic data, wherein the determining the allocation of resources comprises comparing the first graph with the second graph.

2. The system as recited in claim 1, wherein comparing the first graph with the second graph comprises comparing a slope of a first curve of the first graph with a slope of a second curve of the second graph, wherein the first curve is based on the first data and the first synthetic data, and the second curve is based on the second data and the second synthetic data.

3. The system as recited in claim 1, the operations further comprising:
training, using the received data, the plurality of data synthetization machine learning models, respective ones of the data synthetization machine learning models corresponding to respective ones of the plurality of groups of data sources.

4. The system as recited in claim 3, the operations further comprising:
creating a training data set from a first portion of the received data;
creating a plurality of validation data sets from a second portion of the received data, each validation data set corresponding to a respective one of the plurality of groups of data sources; and
validating the respective data synthetization machine learning models using the respective validation data set corresponding to the respective group to which the respective data synthetization machine learning model being validated corresponds.

5. The system as recited in claim 4, wherein the validating comprises determining an optimal amount of synthetic data to produce, respectively, for individual data sources of the plurality of groups data sources.

6. The system as recited in claim 4, wherein the second portion of data is data received most recently within a past threshold period of time.

7. A method comprising:
receiving, by one or more processors, data from a plurality of groups of data sources;
accessing, by the one or more processors, a plurality of data synthetization machine learning models configured for generating synthetic data, respective ones of the data synthetization machine learning models corresponding to respective ones of the groups of data sources;
generating first synthetic data by inputting, to a first one of the data synthetization machine learning models, first data received from a first data source corresponding to a first group of data sources for which the first data synthetization machine learning model is trained;
generating second synthetic data by inputting, to a second one of the data synthetization machine learning models, second data received from a second data source corresponding to a second group of data sources for which the second data synthetization machine learning model is trained;
determining a first graph using the first data received from the first data source and the first synthetic data generated by the first data synthetization machine learning model;

determining a second graph using the second data received from the second data source and the second synthetic data generated by the second data synthetization machine learning model; and determining an allocation of resources based at least in part on comparing the first data and the first synthetic data with the second data and the second synthetic data, wherein the determining the allocation of resources comprises comparing the first graph with the second graph.

8. The method as recited in claim 7, wherein comparing the first graph with the second graph comprises comparing a slope of a first curve of the first graph with a slope of a second curve of the second graph, wherein the first curve is based on the first data and the first synthetic data, and the second curve is based on the second data and the second synthetic data.

9. The method as recited in claim 7, further comprising:
training, using the received data, the plurality of data synthetization machine learning models, respective ones of the data synthetization machine learning models corresponding to respective ones of the plurality of groups of data sources.

10. The method as recited in claim 9, further comprising:
creating a training data set from a first portion of the received data;
creating a plurality of validation data sets from a second portion of the received data, each validation data set corresponding to a respective one of the plurality of groups of data sources; and
validating the respective data synthetization machine learning models using the respective validation data set corresponding to the respective group to which the respective data synthetization machine learning model being validated corresponds.

11. The method as recited in claim 10, wherein the validating comprises determining an optimal amount of synthetic data to produce, respectively, for individual data sources of the plurality of groups data sources.

12. The method as recited in claim 10, wherein the second portion of data is data received most recently within a past threshold period of time.

13. A non-transitory computer-readable medium maintaining instructions executable to configure one or more processors to perform operations comprising:
receiving, by the one or more processors, data from a plurality of groups of data sources;
accessing, by the one or more processors, a plurality of data synthetization machine learning models configured for generating synthetic data, respective ones of the data synthetization machine learning models corresponding to respective ones of the groups of data sources;
generating first synthetic data by inputting, to a first one of the data synthetization machine learning models, first data received from a first data source corresponding to a first group of data sources for which the first data synthetization machine learning model is trained;
generating second synthetic data by inputting, to a second one of the data synthetization machine learning models, second data received from a second data source corresponding to a second group of data sources for which the second data synthetization machine learning model is trained;

determining a first graph using the first data received from the first data source and the first synthetic data generated by the first data synthetization machine learning model;

determining a second graph using the second data received from the second data source and the second synthetic data generated by the second data synthetization machine learning model; and determining an allocation of resources based at least in part on comparing the first data and the first synthetic data with the second data and the second synthetic data, wherein the determining the allocation of resources comprises comparing the first graph with the second graph.

14. The non-transitory computer-readable medium as recited in claim 13, wherein comparing the first graph with the second graph comprises comparing a slope of a first curve of the first graph with a slope of a second curve of the second graph, wherein the first curve is based on the first data and the first synthetic data, and the second curve is based on the second data and the second synthetic data.

15. The non-transitory computer-readable medium as recited in claim 13, the operations further comprising:

training, using the received data, the plurality of data synthetization machine learning models, respective ones of the data synthetization machine learning models corresponding to respective ones of the plurality of groups of data sources.

16. The non-transitory computer-readable medium as recited in claim 15, the operations further comprising:

creating a training data set from a first portion of the received data;

creating a plurality of validation data sets from a second portion of the received data, each validation data set corresponding to a respective one of the plurality of groups of data sources; and validating the respective data synthetization machine learning models using the respective validation data set corresponding to the respective group to which the respective data synthetization machine learning model being validated corresponds.

17. The non-transitory computer-readable medium as recited in claim 16, wherein the validating comprises determining an optimal amount of synthetic data to produce, respectively, for individual data sources of the plurality of groups data sources.

* * * * *